United States Patent [19]

West et al.

[11] 4,388,120

[45] Jun. 14, 1983

[54] ELECTROCHEMICAL CLEANING CASCADE WASH

[75] Inventors: Jon K. West; Arthur J. Catotti, both of Gainesville, Fla.; Michael J. Wynn, Latham, N.Y.

[73] Assignee: General Electric Company, Gainesville, Fla.

[21] Appl. No.: 375,907

[22] Filed: May 7, 1982

Related U.S. Application Data

[63] Continuation of Ser. No. 191,220, Sep. 26, 1980, abandoned.

[51] Int. Cl.$^3$ .............................................. B08B 1/02
[52] U.S. Cl. ..................................... 134/15; 134/60; 134/64 R
[58] Field of Search ................... 134/15, 32, 60, 64 R, 134/64 D, 122 R, 122 P

[56] References Cited

U.S. PATENT DOCUMENTS

| | | | |
|---|---|---|---|
| 1,544,506 | 6/1925 | Tytus | 134/15 |
| 2,529,762 | 11/1950 | Brisse | 134/15 |
| 2,717,845 | 9/1955 | Carter | 134/15 |
| 3,730,667 | 5/1973 | Tani et al. | 134/64 R |
| 3,896,828 | 7/1975 | Foster et al. | 134/60 |
| 4,039,349 | 8/1977 | Kwasnoski et al. | 134/15 |

*Primary Examiner*—Ferris H. Lander
*Attorney, Agent, or Firm*—Henry J. Policinski

[57] ABSTRACT

A system and method for washing flexible strip material using low amounts of fresh rinse water. The system comprises a wash tank having cascaded compartments and means for passing strip material into the tank and in serpentine fashion through the compartments. In the method the strip material in passing from one compartment to the next is raised above the wash liquid permitting wash liquid to drain back into the wash compartment from which it emerged.

2 Claims, 1 Drawing Figure

ELECTROCHEMICAL CLEANING CASCADE WASH

This is a continuation of application Ser. No. 191,220, filed Sept. 26, 1980, now abandoned.

DESCRIPTION

1. Technical Field

This invention is in the general field of fabricating products from metal, more particularly to processes for cleaning the surfaces of coated metal substrates, and more specifically to processes for washing the surfaces of coated flexible strips having a metal substrate.

2. Background Art

Metal fabricating and finishing processes usually include a variety of steps such as reducing, oxidizing, shaping, coating, heat-treating, cleaning and rinsing. Cleaning steps, using either or both physical and chemical means, and rinsing steps are frequently interspersed between other process steps, and an overall process may include many cleaning and rinsing steps.

Problems may arise in disposing of effluents from these cleaning and rinsing steps. The effluents may contain chemicals which, because of their hazardous nature present environmental problems in disposal, or which, because of their value, call for recovery steps. Furthermore, some cleaning and rinsing steps require large volumes of water, the cost of which in the absence of recycling can significantly increase the total process costs.

Metal fabrication processes involving handling long strips of metal, coated or uncoated, may present special problems in some steps of the processes. Specific treatment steps may not be adaptable for treating the entire strip at one time and cleaning and rinsing steps in processes producing long continuous strips have, at least in some processes, required large amounts of water.

DISCLOSURE OF INVENTION

It is accordingly one object of the invention to provide a method of washing contaminants from strip material which reduces the amount of water used.

It is another object to provide a method of washing and/or rinsing contaminants from strip material which reduces the amount of water used and at the same time decreases the amount of contaminants remaining on the strip.

It is still another object to provide a method of washing and/or rinsing chemicals from strip material wherein the effluent water contains a usefully high concentration of chemicals.

It is still another object to provide a method of treating a strip with a chemical, and rinsing the chemical from the strip in a rinsing step which produces an effluent useful for recycling.

In accordance with this invention a system has been provided for washing flexible strip material comprising:

a wash tank having fluid inlet means at a first end, fluid outlet means at a second end, a plurality of vertically-oriented plates disposed within said tank between said first and second ends and dividing said tank into a first wash zone, a final wash zone, and at least one intermediate wash zone, the upper ends of said plates being at progressively lower levels in progressing from said fluid inlet to said fluid outlet, said zones thereby being cascaded downwardly in passing from said final wash zone to said first wash zone;

means for feeding strip material into said wash tank at said first wash zone and passing said strip material in serpentine fashion downwardly then upwardly within each of said wash zones; and means for vertically raising strip material exiting from said wash zones a sufficient height to permit drainage of at least a portion of wash liquid back to the wash zone from which the strip material was removed.

A method has also been provided which, in conjunction with the system is highly effective in cleaning strip material using low flow rates of water by passing the strip material through the foregoing system countercurrently to the liquid and permitting the wash liquid to drain from the strip material after emerging from one wash zone and before entering the next succeeding wash zone. The rate of movement of the strip material and flow of water may be adjusted to produce a highly decontaminated strip and a concentrated effluent.

BRIEF DESCRIPTION OF THE DRAWINGS

For a better understanding of the invention reference is made to the following description of a preferred embodiment taken in conjunction with the FIGURE which is a schematic diagram of a system in which the process of the invention may be used.

BEST MODE FOR CARRYING OUT THE INVENTION

Figure 1:
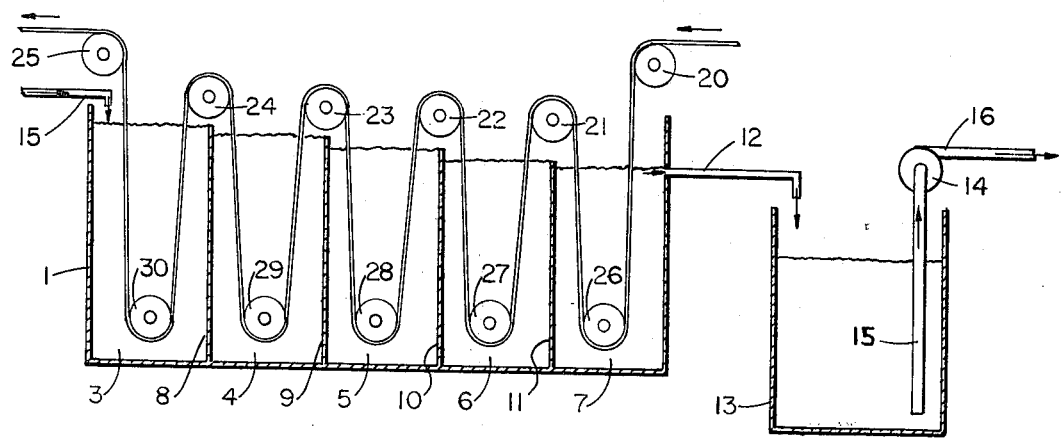

A system for washing strip material in accordance with the invention is shown in the FIGURE in which wash tank 1 is provided with plates 8, 9, 10 and 11 of progressively decreasing height thus separating the tank into cascaded washing zones 3, 4, 5, 6 and 7. The tank is provided with fluid inlet 15 and fluid outlet 12 leading to a liquid collection vessel 13. Guide means 20 through 30 are provided to guide strip material 14 into the wash tank 1, through the wash zones 3-7, and out of the tank. Pump 14 removes liquid from tank 13 through pipe 15 for recycling through outlet 16.

Upper guide means 21, 22, 23 and 24 are disposed far enough above the surface of the liquid within the respective wash zones so that liquid carried upwardly on the strip as it is moving from one zone to the next will drain back into the zone from which it is carried. A vertical draining distance of from about one to about three feet or over may be provided. Distances greater than about three feet have little additional effect, although they may be used. The preferred distance is from aout one to about two feet.

In a process of washing strip material using this invention strip material 14 is passed over guide means 20 downwardly into wash zone 7, around guide means 26 then upwardly toward guide 21. The strip progresses in this manner through all the wash zones, passes over guide means 25, and is withdrawn from the wash tank.

Wash water is introduced into the tank 1 at inlet 15 and flows countercurrently to the movement of the strip material.

The height and number of wash zones determine the length of travel of the strip through the wash tank. The wash zones may suitably range from three to five feet high and are preferably about four feet high. The number of wash zones and length of travel of the strip through each wash zone may be varied depending on the degree of decontamination desired, the water flow rate selected, and the desired composition of the effluent. For washing strip material from which battery plates are made, contaminated with NaOH, and using a flow rate within the preferred range of about 0.25 to about 0.50 gallon per minute the number of wash zones may suitably range from four to ten, with six to eight zones the preferred range. The strip may suitably travel 40 to over 100 feet in passing through the wash zones, a travel distance of about 50 to 80 being preferred. The flow rate of water can be reduced to some extent as the number of zones increases; however, little decrease will be achieved as the number of zones exceeds about ten. The flow rate of water may suitably range from less than 0.25 to over three gallons per minute. Greater quantities generally have the adverse effects of wasting water, and producing an effluent too dilute to be most useful without a significant increase in contaminant removal.

The rate of movement of the strip material may be determined by other process considerations. However, the preferred rate of travel is from 10 to 15 feet per minute.

Having thus described the invention, the following example is offered to show one embodiment in more detail.

EXAMPLE 1

A system was built in accordance with the FIGURE using a tank about 36 inches wide, about 48 inches deep and about 12 feet long divided into 8 cascaded wash zones. The distance between each of the plates dividing the tank into separate wash zones was about 18 inches and the height of the plates was established to drop the liquid level about 2 inches in passing between sections. The guide means at the top of the plates and in the lower portion of the washing zones comprised rollers, and the top edge of the rollers at the top of the plates was set to provide a vertical distance of about 18 inches for vertical movement of the strip above the liquid in the wash zone.

The strip material to be washed was 0.002 inch thick and 8 inches wide mild steel coated on each side wih 0.040 inch of porous nickel impregnated with nickel hydroxide. the strip was introduced into the wash tank at a rate of about 10 feet per minute.

Deionized water was introduced at the opposite end of the tank at a rate of about 0.35 gallons per minute, flowing countercurrently to the path of the strip material. The effluent contained about 150 to 200 grams of sodium hydroxide per liter, a concentration usefully high for use in other process steps without adding sodium hydroxide, and the strip withdrawn from the tank retained less than half the concentration of NaOH per unit area as strip material washed in a single zone with the flow of wash water about 30 times as great.

EXAMPLE 2

Strip material, substantially the same as that of Example 1 before washing, was passed through a single zone bath similar to one of the zones in the system used in example 1. The flow rate of water was 10 gallons per minute, and the strip was moved through the wash zone at a rate of about 10 feet per minute. The amount of sodium hydroxide left on the strip was twice the amount of Example 1, and the concentration of sodium hydroxide in the efflluent was about 5 to about 7 grams per liter. This concentration of sodium hydroxide was too low for use in some parts of the process without adding more sodium hydroxide.

While the invention has been described in conjunction with a specific embodiment, alterations and modifications will be apparent in light of this description and it is intended that the invention be limited only as is indicated by the following claims.

We claim:

1. In a process of making battery plates, a method of removing impurities comprising sodium hydroxide from a surface of flexible strip material and recycling said sodium hydroxide, said flexible strip material comprising a mild steel substrate covered with a porous nickel layer filled with nickel hydroxide or cadmium hydroxide, said method comprising:

providing a system for washing said flexible strip material comprising a wash tank containing a plurality of vertically-oriented plates dividing said tanks into a first wash zone, a final wash zone, and at least one intermediate wash zone, the upper ends of said plates being at progressively lower levels in progressing from said final wash zone to said first wash zone;

introducing rinse water into said final wash zone at a rate from about 0.25 to about 0.5 gallons per minute and passing it through said intermediate and first wash zones, said rinse water flowing from each of said final and intermediate wash zones to the next succeeding wash zone over the upper ends of said plates dividing said tank into separate wash zones, thereby cascading from each wash zone to the next succeeding wash zone;

introducing said strip material having impurities comprising sodium hydroxide on at least one surface of said strip material into said first wash zone at a rate up to about 15 feet per minute and passing it through said first, intermediate, and final wash zones countercurrently to the flow of said rinse water whereby sodium hydroxide on the surface of said strip material is dissolved by said rinse water to produce a sodium hydroxide-containing effluent, said strip material following a serpentine path through said system, passing downwardly and then upwardly within each of said washing zones, said strip material being raised vertically from the surface of liquid within said wash zones a sufficient distance to permit at least a portion of the rinse water to drain back into the wash zone from which the strip emerged; and, recycling the resulting effluent.

2. The process of claim 1 wherein the effluent contains sodium hydroxide in a concentration from about 150 to about 200 grams per liter.

* * * * *